United States Patent [19]

Bata

[11] Patent Number: 5,713,536
[45] Date of Patent: Feb. 3, 1998

[54] AEROSTAT SINGLE BALLONET SYSTEM

[75] Inventor: Bohus T. Bata, Columbia, Md.

[73] Assignee: TCOM, L.P., Columbia, Md.

[21] Appl. No.: 458,751

[22] Filed: Jun. 2, 1995

[51] Int. Cl.$^6$ .................................................. B64B 1/58
[52] U.S. Cl. ............................................ 244/96; 244/128
[58] Field of Search .............................. 244/30, 31, 96, 244/97, 98, 99, 125, 128

[56] References Cited

U.S. PATENT DOCUMENTS

| | | |
|---|---|---|
| 607,240 | 7/1898 | Hite . |
| 907,992 | 12/1908 | Grube ........................................ 244/97 |
| 998,538 | 7/1911 | Lehmann . |
| 3,706,433 | 12/1972 | Sonstegaard . |
| 4,773,617 | 9/1988 | McCampbell . |

FOREIGN PATENT DOCUMENTS

| | | |
|---|---|---|
| 396191 | 4/1909 | France . |
| 424413 | 3/1911 | France . |
| 239989 | 10/1911 | Germany . |
| 501360 | 6/1930 | Germany . |
| 22124 | 1/1914 | United Kingdom . |

*Primary Examiner*—Galen L. Barefoot

[57] ABSTRACT

An aerostat, including an aerostat hull and a single ballonet, attached to said aerostat hull, along an attachment line, the attachment line dividing a helium compartment formed by said aerostat hull into a forward helium compartment and an aft helium compartment, wherein a ratio of a volume of the forward helium compartment to volume of the aft helium compartment is equal to a ratio of a volume of the single ballonet forward of the attachment line to a volume of the single ballonet aft of the attachment line.

14 Claims, 2 Drawing Sheets

AEROSTAT SINGLE BALLONET SYSTEM

This invention relates generally to an aerostat single ballonet system which permits operation of tethered aerostats at very high altitudes without the necessity of any special active control to maintain stability.

An aerostat is defined as a lighter-than-air craft, which is tethered and has no pilot. Conversely, airships are lighter-than-air crafts which are free-flying and piloted.

The aerodynamic shape of a conventional aerostat 10 illustrated in FIG. 1, is maintained by including an air-filled compartment, called a ballonet 12 within and on the bottom of the aerostat hull 14, which decreases or increases in size, depending on the degree of helium expansion within the aerostat hull 14. This change in size is accomplished by actively blowing air into the air-filled compartment 12 or valving off the air during helium expansion periods.

Although a conventional airship 20, illustrated in FIG. 2, typically has two or more of these compartments or ballonets 22, aerostats historically have contained only a single ballonet. In the case of airships, ballonets were and are used to control the forward and aft trim of the airship by shifting the center of lift by adjusting the amount of fill in each of the ballonets. This adjustment is accomplished by visual inspection of the ballonets 22 by the pilot at point 24.

In the case of aerostats, which do not have an onboard pilot, this inspection is not possible, and trimming had to be designed into a single ballonet shape and location, because no reliable remote technique of determining the amount of fill of each of the ballonets was known. A conventional single ballonet design works acceptably in aerostats, only if the ballonet volume does not exceed approximately 50 percent of the volume of the aerostat hull. Any ballonet with a volume in excess of approximately 50percent of the aerostat hull is likely to result in a aerostat which is bistable. An aerostat is bistable when the aerostat is placed in a nose down attitude and its nose does not rise, or conversely, when the aerostat is placed in a nose up attitude and its nose does not come down.

Bistability of aerostats having ballonets in excess of approximately 50 percent of the volume of the hull is likely to occur with a water line ballonet such as the one illustrated in FIG. 1.

In order to operate an aerostat at very high altitudes (such as 30,000 ft. or higher), ballonets having volumes of 75 percent or more of the aerostat hull are required. A dual ballonet system would solve the instability problem, however, as set forth above, the lack of a reliable ballonet volume control system makes an aerostat dual ballonet system impractical.

Accordingly, the present invention is directed to an aerostat single ballonet system, which includes a single air-filled ballonet and dual helium compartments, which make it possible to have a single large ballonet, with only a pressure, not volume, control, which maintains a single point of equilibrium.

SUMMARY OF THE INVENTION

Accordingly, it is the primary object of the present invention to provide an aerostat which operates at very high altitudes, as a result of a single-ballonet system.

Another object of the present invention is to provide an aerostat having a single ballonet, the volume of which is greater than 50 percent of a volume of the aerostat hull itself.

Another object of the present invention is to provide an aerostat having a single ballonet, the volume of which is greater than 75 percent of the volume of the aerostat hull itself.

It is a further object of the present invention to provide the above-identified aerostat, having a single ballonet and dual helium compartments, in an unmanned tethered aerostat.

The objects of the present invention are fulfilled by providing an aerostat, comprising: an aerostat hull; and a single ballonet, attached to said aerostat hull, along an attachment line, the attachment line dividing a helium compartment formed by said aerostat hull into a forward helium compartment and an aft helium compartment, wherein a ratio of a volume of the forward helium compartment to volume of the aft helium compartment is equal to a ratio of a volume of the single ballonet forward of the attachment line to a volume of the single ballonet aft of the attachment line.

An important aspect of the present invention is to provide a single ballonet, dual helium compartment aerostat, which has a single point of equilibrium, and permits the aerostat to operate at high altitudes.

Another important aspect of the present invention is to provide a single ballonet, dual helium compartments wherein the volume of the single ballonet is greater than 50% of the volume of the aerostat hull itself.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by way of illustration only, and thus, are not limitive of the present invention and wherein.

DETAILED DESCRIPTION OF THE PREFERRED EMBODIMENT

Figure 1:
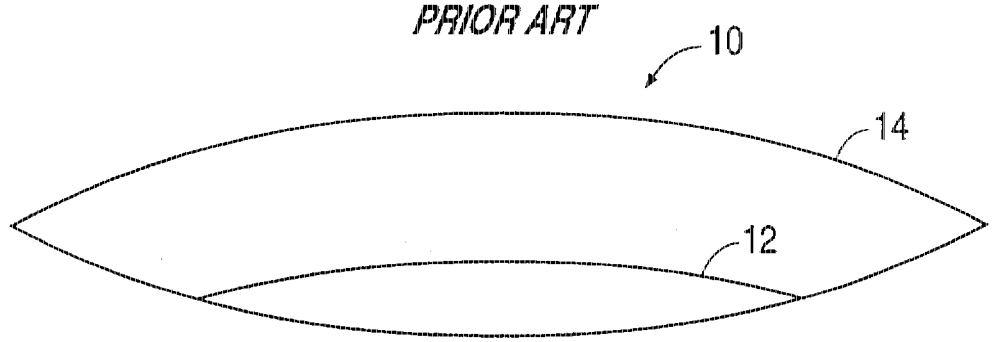
FIG. 1 illustrates a conventional aerostat.
Figure 2:
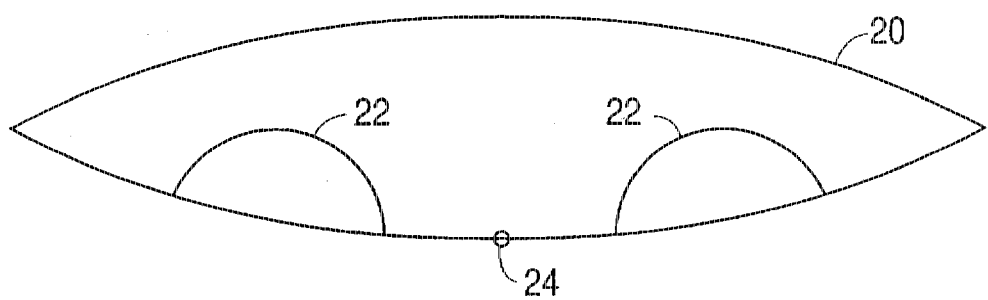
FIG. 2 illustrates a conventional airship.
Figure 3:
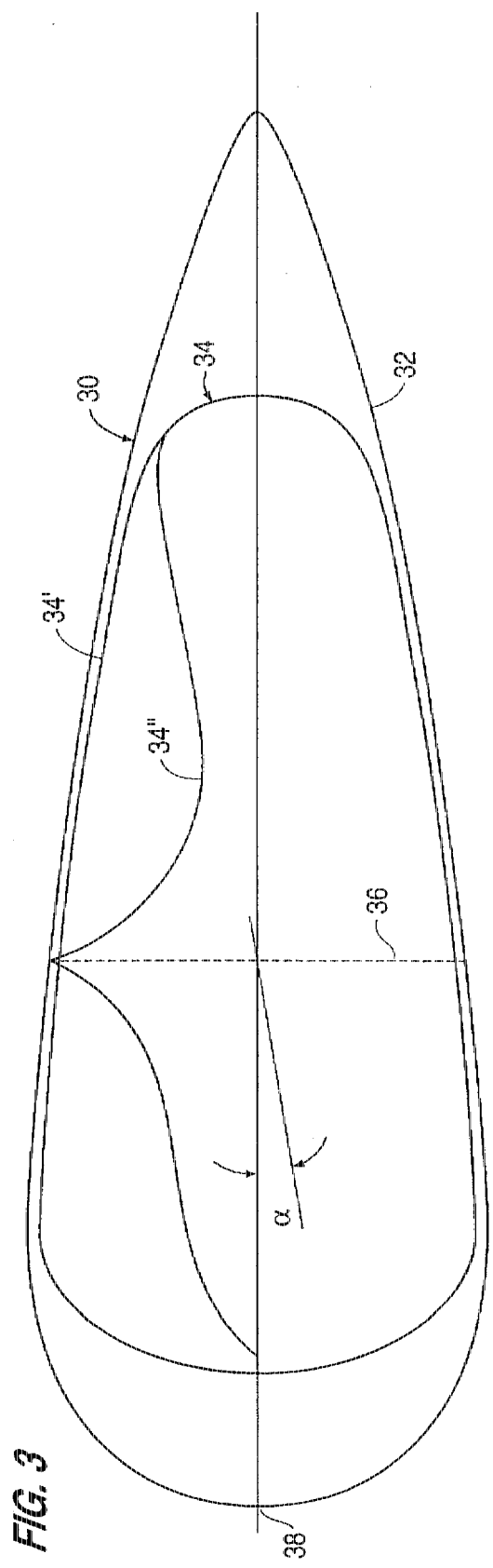
FIG. 3 illustrates the aerostat single ballonet system in one embodiment of the present invention.

The overall aerostat single ballonet system 30 is illustrated in FIG. 3, and includes an aerostat hull 32 and a ballonet 34, illustrated both fully inflated 34' and partially inflated 34" at a trim angle α. The ballonet 34 is tank-shaped in order to conform to the shape of the aerostat hull 32. The ballonet 34 is attached to the aerostat hull 32 around the circumference of the aerostat hull 32 along attachment line 36. In a preferred embodiment, the attachment line 36 is a constant distance from the nose 38 of the aerostat hull 32. Attachment line 36 divides the aerostat hull volume, filled with helium, into two compartments, a forward and aft compartment. As a result of this geometry, the ballonet volumes forward and aft of the attachment line 36 are in the same ratio as the volumes of the corresponding helium compartments.

Even with the ballonet 34 as a single compartment, the volume of air in its forward compartment will always adjust itself to the demands of the forward helium compartment of the aerostat hull 32 and the volume of the air in the aft portion of the ballonet 34 will always adjust itself to the demands of the aft helium compartment of the aerostat hull 32, independently. This occurs because the helium quantity in both the forward and aft portions of the aerostat hull 32 are fixed and have their own expansion characteristics.

As a result of the split in the total helium volume into the forward and aft compartments, any shift in the position of a lift vector is minimized and potential static instability is eliminated. The aerostat single ballonet system 30, illustrated in FIG. 3 eliminates the need to know the individual ballonet volumes.

The invention being thus described, and will be obvious that the same may be varied in many ways. Such variations are not to be regarded as a departure from the spirit and scope of the invention, and all such modifications as would be obvious to one skilled in the art are intended to be included within the scope of the following claims.

I claim:

1. An aerostat, comprising:

an aerostat hull; and a single ballonet, attached to said aerostat hull, along an attachment line, the attachment line dividing a helium compartment formed by said aerostat hull into a forward helium compartment and an aft helium compartment, wherein a ratio of a volume of the forward helium compartment to a volume of the aft helium compartment is equal to a ratio of a volume of the single ballonet forward of the attachment line to a volume of the single ballonet aft of the attachment line and the ratio is always the same whether said aerostat is ascending, descending, or maintaining a constant altitude;

wherein the arrangement of said single ballonet and said aerostat hull alleviate a need for an active transfer of a lifting gas.

2. The aerostat of claim 1, wherein a long axis of said aerostat hull is parallel to a long axis of said single ballonet.

3. The aerostat of claim 1, wherein a volume of said aerostat hull is constant.

4. The aerostat of claim 1, wherein said aerostat operates at an altitude of 30,000 feet or greater.

5. The aerostat of claim 1, wherein said aerostat operates without any active controls to maintain stability.

6. The aerostat of claim 1, wherein pressure control is used to maintain equilibrium in said aerostat.

7. The aerostat of claim 1, wherein trim and stability of said aerostat can be maintained without knowledge of a volume of said single ballonet.

8. The aerostat of claim 1, wherein said aerostat has a single point of equilibrium.

9. The aerostat of claim 1, wherein said single ballonet is tank-shaped to conform to a shape of said aerostat hull.

10. The aerostat of claim 1, wherein said aerostat is an unmanned tethered aerostat.

11. The aerostat of claim 1, wherein the attachment line is equidistant from a nose of said aerostat hull.

12. An aerostat, comprising:

an aerostat hull; and a single ballonet, attached to said aerostat hull, along an attachment line, the attachment line dividing a helium compartment formed by said aerostat hull into a forward helium compartment and an aft helium compartment, wherein a ratio of a volume of the forward helium compartment to a volume of the aft helium compartment is equal to a ratio of a volume of the single ballonet forward of the attachment line to a volume of the single ballonet aft of the attachment line;

wherein a total volume of said single ballonet is greater than 50% of a volume of the helium compartment formed by said aerostat hull.

13. The aerostat of claim 12, wherein said aerostat operates in a non-bistable condition.

14. An aerostat, comprising:

an aerostat hull; and a single ballonet, attached to said aerostat hull, along an attachment line, the attachment line dividing a helium compartment formed by said aerostat hull into a forward helium compartment and an aft helium compartment, wherein a ratio of a volume of the forward helium compartment to a volume of the aft helium compartment is equal to a ratio of a volume of the single ballonet forward of the attachment line to a volume of the single ballonet aft of the attachment line;

wherein a total volume of said single ballonet is greater than 75% of a volume of the helium compartment formed by said aerostat hull.

* * * * *